United States Patent [19]

Sasaki et al.

[11] 4,435,475

[45] Mar. 6, 1984

[54] DIELECTRIC FILM

[75] Inventors: Tohru Sasaki; Syuuzi Terasaki; Hideo Munakata; Mitsuru Ohta, all of Iwaki, Japan

[73] Assignee: Kureha Kagaku Kogyo Kabushiki Kaisha, Tokyo, Japan

[21] Appl. No.: 249,900

[22] Filed: Apr. 1, 1981

[30] Foreign Application Priority Data

Apr. 24, 1980 [JP] Japan .................. 55-54998

[51] Int. Cl.$^3$ ............... B32B 27/30; B32B 27/36; N01G 4/08
[52] U.S. Cl. .................. 428/409; 361/323; 428/412; 428/421; 428/422; 428/480; 428/522; 524/311
[58] Field of Search ............... 428/412, 421, 480, 483, 428/500, 422, 409, 522; 29/25.42; 361/323; 524/311

[56] References Cited

U.S. PATENT DOCUMENTS

| | | | |
|---|---|---|---|
| 3,541,039 | 11/1970 | Whiton | 524/311 |
| 3,991,451 | 11/1976 | Maruyama et al. | 29/25.42 |
| 4,166,876 | 9/1979 | Chiba et al. | 428/421 X |
| 4,173,033 | 10/1979 | Sako et al. | 361/323 |
| 4,241,128 | 12/1980 | Wang | 428/421 X |
| 4,297,427 | 10/1981 | Williams et al. | 428/421 X |
| 4,298,719 | 11/1981 | Mizuno et al. | 428/422 X |

*Primary Examiner*—Thomas J. Herbert, Jr.
*Attorney, Agent, or Firm*—Wegner & Bretschneider

[57] ABSTRACT

A film prepared by molding a resin compound of a polyvinylidene fluoride admixed with a polycarbonate and/or a thermoplastic polyester and stretching into at least one direction is disclosed. The film shows excellent dielectric properties.

7 Claims, No Drawings

DIELECTRIC FILM

SUMMARY OF THE INVENTION

The present invention relates to a film having dielectric properties.

The film according to the present invention is characterized in that it is an oriented film prepared by stretching a molded film of a resin compound comprising 99.5 to 70 parts by weight of polyvinylidene fluoride and 0.5 to 30 parts by weight of a polycarbonate and/or a thermoplastic polyester, and it has a minutely rough superficial texture.

The film according to the present invention is excellent in electrical properties such as dielectrical tangent and volume resistivity, and accordingly, it is useful as a dielectric material.

The term "polyvinylidene fluoride" herein referred to means not only homopolymers of vinylidene fluoride but also copolymers which are formed by copolymerization with other monomer(s) copolymerizable with vinylidene fluoride.

DETAILED DESCRIPTION OF THE INVENTION

The object of the present invention is to provide a plastic film excellent in electrical properties. Other objects of the present invention will be made clear from the following description:

It has been well known that a stretched film formed by molding of polyvinylidene fluoride has specific electrical properties, for example, a high dielectric constant and a high piezoelectric constant which are never seen in other plastic films, and accordingly, the stretched film of polyvinylidene fluoride has been applied in condensers and piezoelectric elements in electronic apparatus.

Namely, since the dielectric constant of the stretched film of polyvinylidene fluoride is 3 to 5 times higher than those of other plastic films, it is suitable as a dielectric material for condensers and when applied as a dielectric material for capacity switches, it can improve the sensitivity of the switches.

On the other hand, since the stretched film of polyvinylidene fluoride has a large dielectric tangent (tan $\delta$), and a small volume resistivity, demerits of causing a large loss rate and a low insulating resistivity of the condenser in which it is used are seen.

Accordingly, in the case where such a condenser is used for, for example, a high frequency current, its dielectric loss is extremely large and so, its field of application is restricted.

Moreover, since the conventional stretched film of polyvinylidene fluoride has smooth surfaces without any affinity to insulating oils, a problem occurs when the film is applied into oil-impregnated condensers. In addition, there is another demerit in the conventional stretched film of polyvinylidene fluoride that such a film of polyvinylidene fluoride itself is poor in processability in the steps of winding and of vacuum-evaporation and deposition of a metal onto the film.

In order to improve the state of surfaces of films of polyvinylidene fluoride, methods have been hitherto known in which the film is mechanically embossed on its surfaces or the film is molded from a resin compound formed by admixing a small amount of an inorganic substance with polyvinylidene fluoride. However, in cases where such a method is applied, although the surfaces of the film are made to be rough, there is a tendency of forming voids in the film, and particularly, in the case where the inorganic substance is added, voids are apt to be formed in the film when it is stretched because of the absence of affinity of the substance to polyvinylidene fluoride, resulting in the large reduction of voltage to which the film is to withstand. Accordingly, such a method could not be practiced.

After having made efforts in studying the way of overcoming the above-mentioned demerits in dielectricity of films of polyvinylidene fluoride, the present inventors have attained the present invention.

The present invention is explained in detail in the following:

The film according to the present invention is an oriented film prepared by molding a resin comprising 99.5 to 70 parts by weight of polyvinylidene fluoride and 0.5 to 30 parts by weight of a polycarbonate and/or a thermoplastic polyester and stretching in at least one direction.

Since polyvinylidene fluoride is normally highly crystalline and is not compatible with almost all other polymers, it has been deemed that the compounding of polyvinylidene fluoride with any other polymer is difficult with only one exception of a report on the compatibility with polymethyl methacrylate (refer to the Japanese Patent Publication No. 43-12012/1978). It has been known that a sheet molded from a resin compound of polyvinylidene fluoride mixed with a polymethyl methacrylate has an excellent transparency; however, the electrical properties of the film obtained by stretching the unoriented film of polyvinylidene fluoride admixed with polymethyl methacrylate are rather inferior to those of the film of polyvinylidene fluoride, and moreover, since the surface of the film of such a resin compound is more smooth than that of the film of polyvinylidene fluoride, such a film is not to be applied as a dielectric material.

Although the polycarbonate and the thermoplastic polyester for use in the film according to the present invention are not so molecularly compatible with polyvinylidene fluoride as polymethyl methacrylate, they have, to a certain degree, an affinity to polyvinylidene fluoride because of the ester linkages in their molecular chains and accordingly, there are no fears of causing voids when the film prepared by the resin composition of polyvinylidene fluoride and one of them is stretched.

Moreover, since the polycarbonate and the thermoplastic polyester are not compatible with polyvinylidene fluoride, there are minute particles of them dispersed in the film prepared from the resin composition of polyvinylidene fluoride and the polycarbonate and/or the thermoplastic polyester, and accordingly, when the film is stretched, the surfaces are brought into a rough state, it is presumed.

In cases where the polyvinylidene fluoride which is the main component of the film of the present invention is a copolymer containing more than 50 mole % of vinylidene fluoride units with a comonomer copolymerizable with vinylidene fluoride, the comonomer includes tetrafluoroethylene, hexafluoropropylene, trifluoroethylene, trifluorochloroethylene and vinyl fluoride. In addition, the polyvinylidene fluoride which is the main component of the film according to the present invention preferably has an inherent viscosity ($\eta_{inh}$) of 0.6–1.8. The inherent viscosity is derived from the following formula:

$$\eta_{inh} = \frac{1}{C} \ln \frac{\eta}{\eta_0}$$

wherein $\eta$ is the viscosity of a solution of polyvinylidene fluoride in dimethylformamide at a concentration of 0.4 g/dl at a temperature of 30° C.; $\eta_0$ is the viscosity of dimethylformamide at 30° C.; ln is the symbol of natural logarithm and C is the concentration (0.4 g/dl).

In cases where the value of $\eta_{inh}$ is over 1.8, the processability of polyvinylidene fluoride is reduced to make the extruding and molding of a rough-surfaced film difficult, and on the other hand, in cases where it is under 0.6, although the processability is favorable, the mechanical strength of the extruded film becomes weaker resulting in the frequent breakage of the film when stretched.

The thermoplastic polyester which is one of the components of the film according to the present invention is a polyester of high molecular weight, and includes, for example, polymethylene terephthalate (PMT), polyethylene terephthalate (PET), polybutylene terephthalate (PBT) and polyethylene naphthalate (PEN).

The polycarbonate which is also one of the components of the film according to the present invention is, in a broader sense, a polyester, and obtained by polycondensation of bisphenol A and phosgen or diphenyl carbonate in the present cases. In addition, the thermoplastic polyester and the polycarbonate may be copolymers with other comonomers and may be those obtained by modifying the polyester or polycarbonate. Each of such a polyester and a polycarbonate may be singly compounded with polyvinylidene fluoride or may be compounded as a mixture of more than two of them.

The mixing ratio by weight of the polycarbonate and/or the thermoplastic polyester to polyvinylidene fluoride is suitably 0.5:99.5 to 30:70, more preferably 1:99 to 20:80, and in cases of over 30:70, the dielectric constant is greatly reduced, and on the other hand, in cases of under 0.5:99.5, the effect of improving the state of the surfaces of the film or the electrical properties of the film cannot be expected.

The film according to the present invention is prepared by the following steps:

A resin composition prepared by admixing 0.5 to 30 parts by weight of the polycarbonate and/or the thermoplastic polyester with 99.5 to 70 parts by weight of polyvinylidene fluoride is, as it is, extruded from an extruder at 200° to 310° C., preferably 220° to 280° C. into a form of a continuous sheet, or after molding the compound into pellets, the pellets are extruded in the same manner as above into a form of a continuous sheet. The thus-obtained sheet is stretched into at least one direction at a temperature of 120° to 180° C. The times of stretching is not specified, however, generally 1.5 to 50 times in square measure, preferably 2 to 30. In addition, stretching can be carried out not only unidirectionally, but also bi-directionally or multi-directionally.

The thus-obtained stretched film has a minutely rough texture in its surfaces and as shown in Examples, is superior to the conventional film prepared solely from polyvinylidene fluoride in the points of electrical properties such as dielectric tangent and volume resistivity, of the clouding value and of the rage of impregnation of insulating oil.

The effects of the present invention are exemplified by the following non-limitative examples: In the examples, the electrical properties, the clouding value, the roughness of the surface and the rate of impregnation of insulating oil of the film of the present invention are shown by the values obtained by the following methods of determination:

(1) Dielectric constant and dielectric tangent

Pieces of electrodes prepared by depositing aluminum in vacuum-evaporation on the both sides of a specimen of the film were used as the specimen of the determination of dielectric constant and dielectric tangent, after setting in a broad-range dielectric loss tester at a temperature of 20° C. and 1 KHz. In addition, the dielectric tangent (tan $\delta$) was shown by %.

(2) Volume resistivity

The same pieces as in (1) were used as the specimen of the determination of volume resistivity, after setting in an ultra-high insulation tester at a temperature of 20° C. after one minute of loading 100 V.D.C. The value was obtained by calculation from the value of Rv.

(3) Clouding value

It was determined following the method of the Japanese Industrial Standard (JIS)-K 5714.

(4) Roughness of the surface of the film

It was judged from the luster of aluminum films deposited by vacuum evaporation on the film surfaces.

(5) Rate of impregnation of insulating oil

After putting two films in lamination, they were, as they were laminated, wound in coil-form around a glass rod of 5 mm in diameter and 100 mm in length to form a wound coil of 20 mm in outer diameter, the width of the film being 60 mm. The coil was completely impregnated into a mineral oil (Japanese Industrial Standard No. 1 oil) in a 1-liter flask under a reduced pressure of $5 \times 10^{-2}$ Torr for 60 min. After taking up the coil of the film, the width (L) of the un-impregnated part between the laminated two films was measured, and the rate of impregnation of insulating oil was obtained by the following formula:

$$\text{Rate of impregnation of insulating oil (\%)} = \frac{60 - L}{60} \times 100$$

EXAMPLE 1

Into a polyvinylidene fluoride of an inherent viscosity of 1.13, a polycarbonate (grade I-3000, manufactured by Idemitsu Petrochemical Co., Ltd. Japan) is compounded at a ratio shown in Table 1, and the thus-obtained resin compound was extruded at 260° C. to be a non-oriented film. The film was then stretched into a longitudinal direction at 160° C. and then stretched into a transverse direction at 170° C. to obtain a bi-axially stretched film of 9 microns in thickness. The properties of the thus-prepared film are shown in Table 1.

The properties of the film prepared solely from the same polyvinylidene fluoride as above by the same manner as above, and the properties of the film prepared from a resin compound of the same polyvinylidene fluoride as above admixed with the same polycarbonate as above by the same manner as above are also shown in Table 1 for comparison as Comparative Examples.

TABLE 1

| | Properties of films of polyvinylidene fluoride | | | | | |
|---|---|---|---|---|---|---|
| Number | Amount of polycarbonate[1] | Dielectric constant | Dielectric tangent (%) | Volume resistivity[2] | Clouding value (%) | Roughness of surface | Rate of oil impregnation (%) |
| No. 1 | 0.5 | 10.4 | 1.30 | 1.8 | 25 | a little rough | 75 |
| No. 2 | 3 | 10.1 | 1.10 | 2.6 | 42 | rough | 100 |
| No. 3 | 9 | 9.0 | 0.90 | 3.3 | 56 | rough | 100 |
| No. 4 | 15 | 8.1 | 0.75 | 5.1 | 75 | rough | 100 |
| No. 5 | 20 | 7.2 | 0.60 | 3.0 | 86 | rough | 100 |
| No. 6 | 30 | 6.0 | 0.42 | 10.0 | 88 | rough | 100 |
| Comparative Example 1 | 0 | 10.8 | 1.50 | 1.1 | 4 | smooth | 20 |
| Comparative Example 2 | 40 | 4.0 | 0.35 | 25.0 | 93 | rough | 100 |

Notes:
[1] parts by weight to 100 parts by weight of the resin compound.
[2] $\times 10^{15}$ ohm·cm As is seen in Table 1, as the amount of polycarbonate in the resin compound increases from 0.5% by weight, the dielectric tangent and the volume resistivity of the film are more improved as compared to those of the film prepared solely from the same polyvinylidene fluoride. However, as the amount of polycarbonate in the resin compound is over 30% by weight of the resin compound, the dielectric constant of the film is greatly reduced, and the film became breakable when stretched.

EXAMPLE 2

Into a polyvinylidene fluoride of an inherent viscosity of 1.03, a polycarbonate (trade name registered of Panlite 1300 W, manufacture by Teijin Kasei Co., Ltd. Japan), a polyethylene terephthalate (PET) (trade name registered of RT 580C manufactured by Toyobo Co., Ltd.) or a copolymer derived from a polyester (grade of PETG 6763 manufactured by Eastman Kodak Co., Ltd., USA) was compounded at a ratio shown in Table 2, and the resin compound was processed to be a bi-axially stretched film in the same manner as in Example 1. The results of evaluation of the thus-obtained film are shown in Table 2.

TABLE 2

| | Properties of films of polyvinylidene fluoride | | | | |
|---|---|---|---|---|---|
| | Name and amount of added polymer | | Dielectric constant | Dielectric tangent | Volume resistivity[2] | Clouding value (%) |
| Number | Name | amount[1] | | | | |
| 7 | Panlite | 10 | 8.5 | 0.80 | 4.5 | 59 |
| 8 | PET RT580C | 5 | 9.5 | 0.95 | 3.1 | 51 |
| 9 | PET RT580C | 10 | 8.7 | 0.85 | 5.2 | 63 |
| 10 | PET RT580C | 15 | 8.3 | 0.80 | 6.5 | 70 |
| 11 | PETG 6763 | 5 | 9.6 | 0.96 | 2.9 | 48 |
| 12 | PETG 6763 | 10 | 8.6 | 0.87 | 4.8 | 55 |
| 13 | PETG 6763 | 15 | 8.4 | 0.82 | 5.6 | 68 |

Notes:
[1] parts by weight to 100 parts by weight of the resin compound.
[2] $\times 10^{15}$ ohm·cm.

As is seen in Table 2, each film showed improved properties for use as a dielectric material, sufficient strongness since they have been bi-axially stretched, a rate of impregnation of insulating oil of 100%, and a fairly high value of withstanding voltage in an insulating oil.

EXAMPLE 3

Into 90 parts by weight of a copolymer of vinylidene fluoride and tetrafluoroethylene containing 90 mole % of vinylidene fluoride units, 10 parts by weight of the polycarbonate (Panlite 1300W) was compounded, and the thus obtained composition was processed in the same manner as in Example 1 to be a bi-axially stretched film of 25 microns in thickness. The dielectric constant, dielectric tangent, volume resistivity and clouding value of the thus obtained film determined were as follows:

| | |
|---|---|
| Dielectric constant | 9.0 |
| Dielectric tangent (%) | 0.9 |
| Volume resistivity | 3.5 $\times 10^{15}$ ohm·cm |
| Clouding value (%) | 60 |

As are seen in Examples 1 to 3, since the film according to the present invention showed electrical properties and state of its surface remarkably improved, it will be well recognized that the film is useful as an electrical insulating material, particularly as a dielectric material for condensers.

What is claimed is:

1. A dielectric film having minutely rough surfaces and prepared by (a) molding a resin composition comprising (i) 99.5 to 70 parts by weight of a polyvinylidene fluoride and (ii) 0.5 to 30 parts by weight of a resin selected from the group consisting of a polycarbonate, a thermoplastic polyester, and mixtures thereof into a continuous sheet and (b) stretching the continuous sheet of (a) in at least one direction to give a dielectric film with minutely rough surfaces.

2. A dielectric film according to claim 1, wherein said polyvinylidene fluoride is a homopolymer of vinylidene fluoride.

3. A dielectric film according to claim 1, wherein said polyvinylidene fluoride has an inherent viscosity in a range of 0.6 to 1.8.

4. A dielectric film according to claim 1, wherein said resin compound is prepared by compounding 1 to 20 parts by weight of said polycarbonate or said thermoplastic polyester into 99 to 80 parts by weight of said polyvinylidene fluoride.

5. A dielectric film according to claim 1, wherein said thermoplastic polyester is a polymethylene terephthalate, a polyethylene terephthalate, a polybutylene terephthalate or a polyethylene naphthalate.

6. A dielectric film according to claim 1, wherein said polyvinylidene fluoride is a copolymer of vinylidene fluoride and another monomer copolymerizable with vinylidene fluoride, containing more than 50 mole % of vinylidene fluoride units.

7. A dielectric film according to claim 6, wherein said monomer copolymerizable with vinylidene fluoride is selected from the group consisting of tetrafluoroethylene, trifluoroethylene, trifluorochloroethylene and vinyl fluoride.

* * * * *